United States Patent [19]

Tanimoto et al.

[11] Patent Number: 4,899,226
[45] Date of Patent: Feb. 6, 1990

[54] IMAGE READING APPARATUS WHICH CORRECTS FOR A READING ERROR CAUSED BY READING AN IMAGE AT A CONTINUOUSLY-VARIABLE IMAGE READING DENSITY WITH STAGGERED LINE IMAGE SENSORS

[75] Inventors: Koji Tanimoto, Yokohama; Kunihiko Miura, Hiratsuka; Junichi Koseki, Tokyo, all of Japan

[73] Assignee: Kabushiki Kaisha Toshiba, Kawasaki, Japan

[21] Appl. No.: 134,508

[22] Filed: Dec. 16, 1987

[30] Foreign Application Priority Data

Dec. 20, 1986 [JP] Japan ................. 61-304363

[51] Int. Cl.$^4$ ................ H04N 1/393; H04N 1/028; H04N 1/10; H04N 1/12
[52] U.S. Cl. ....................... 358/451; 358/77; 358/483; 358/494
[58] Field of Search ........... 358/285, 293, 294, 77, 358/280, 284, 287, 443, 448, 451, 471, 474, 482, 483, 494, 495, 497

[56] References Cited

U.S. PATENT DOCUMENTS

| | | | |
|---|---|---|---|
| 4,146,786 | 3/1979 | Agulnek | 358/293 |
| 4,149,090 | 4/1979 | Agulnek | 358/293 |
| 4,149,091 | 4/1979 | Crean et al. | 358/293 |
| 4,532,551 | 7/1985 | Kurata et al. | 358/293 |
| 4,691,114 | 9/1987 | Hasegawa et al. | 358/293 |
| 4,734,787 | 3/1988 | Hayashi | 358/293 |
| 4,742,240 | 5/1988 | Yamanishi et al. | 358/293 |
| 4,750,048 | 6/1988 | Satoh et al. | 358/287 |

FOREIGN PATENT DOCUMENTS

| | | | |
|---|---|---|---|
| 3611984 | 10/1986 | Fed. Rep. of Germany . | |
| 58-1381 | 1/1983 | Japan | 358/293 |
| 58-14662 | 1/1983 | Japan | 358/293 |
| 58-186254 | 10/1983 | Japan | 358/293 |
| 59-105762 | 6/1984 | Japan | 358/293 |
| 59-228465 | 12/1984 | Japan | 358/293 |
| 61-234166 | 10/1986 | Japan . | |
| 2175170 | 11/1986 | United Kingdom . | |

Primary Examiner—James J. Groody
Assistant Examiner—Randall S. Svihla
Attorney, Agent, or Firm—Cushman, Darby & Cushman

[57] ABSTRACT

An image reading apparatus which has position deviated line sensors. The line sensors are formed by charge coupled devices which are arranged in two staggered rows. The signal from one of the charge coupled devices is delayed for a predetermined period corresponding to the distance between the rows, the speed of scanning and the reading density of the original. An actual timing deviation is calculated to delay one signal relative to the other so that the two signals will be output at the same time.

8 Claims, 6 Drawing Sheets

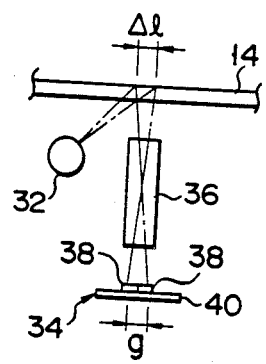
F I G. 4
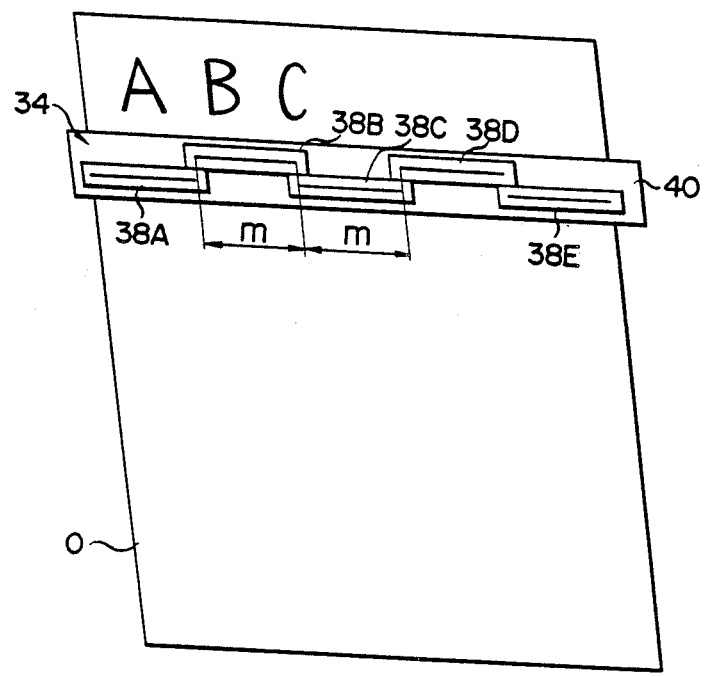
F I G. 5

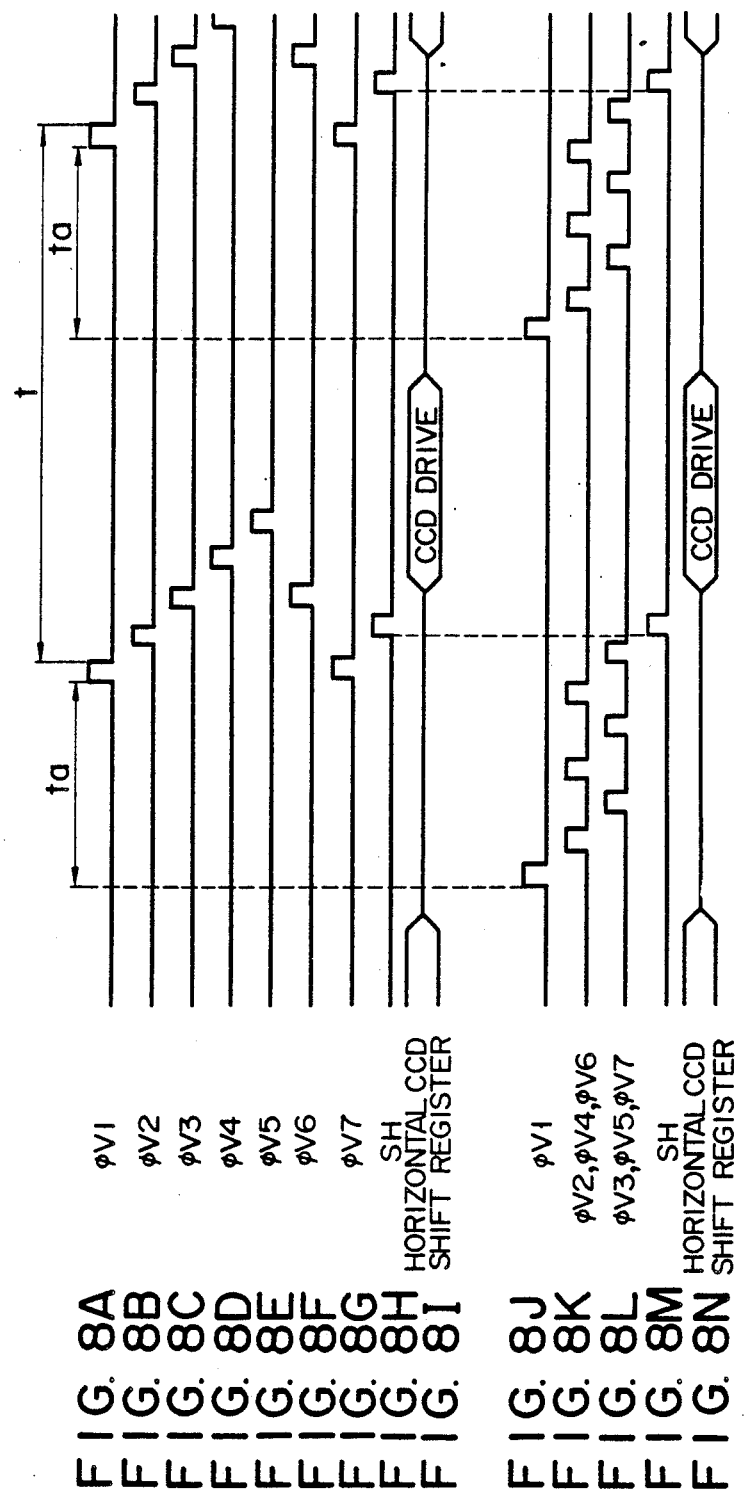

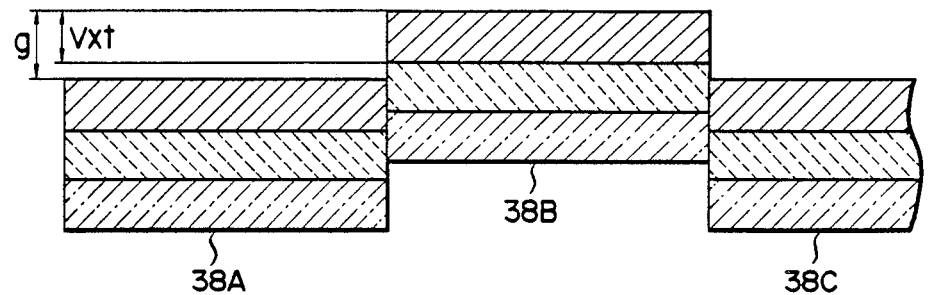
F I G. 9A
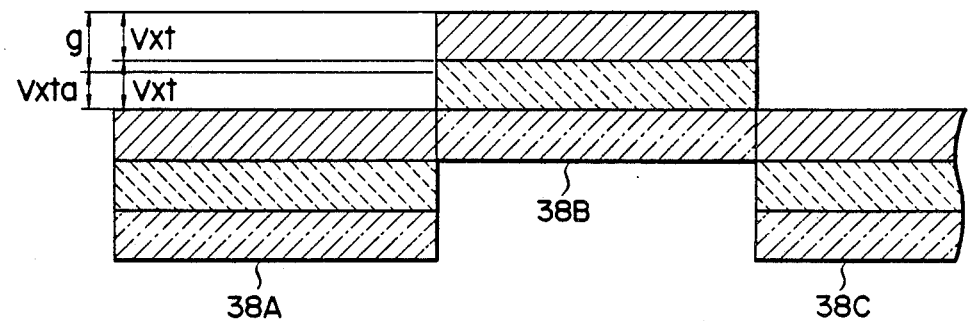
F I G. 9B

IMAGE READING APPARATUS WHICH CORRECTS FOR A READING ERROR CAUSED BY READING AN IMAGE AT A CONTINUOUSLY-VARIABLE IMAGE READING DENSITY WITH STAGGERED LINE IMAGE SENSORS

BACKGROUND OF THE INVENTION

This invention relates generally to an image-reading apparatus having a deviation correcting function and, more particularly, to an image recorder apparatus of the type noted above, in which an original image is read out by charge-coupled devices capable of photoelectric conversion.

Recently, with rapid development of office automation, there has been a demand for an image reader for use in copying machines, facsimile sets, etc., which can perform high-speed and high-resolution reading of image data and is small in size. To meet this demand, image readers using close-contact type image sensors have been developed and used in practice.

In the image reader noted above, a focusing-light lens is used for an optical system connecting optical face and image sensor, and an image sensor is disposed in the vicinity of the original surface for reading image data. In other words, the width of reading of the original is the same as that of the original so that the original image is focused on the same scale on the image sensor. The image sensor of the close-contact type, which provides the same reading width as the original width, comprises a plurality of charge-coupled device image sensor elements (hereinafter referred to as CCD elements) in a staggered arrangement (parallel and alternate arrangements).

When reading image data using the image sensor of the above construction, it is necessary to correct positional (i.e., spatial and time-wise) deviation of the CCD elements according to the speed (or reading density) at which an original is scanned in a secondary scanning direction perpendicular to the scanning direction of the image sensor. Each CCD element has a line memory (or line shift gate), so that the correction is done line by line.

Denoting the positional deviation between first and second rows of CCD elements among the CCD elements in the staggered arrangement noted above by g $\mu$m, and the scanning speed in the secondary scanning direction by Vx $\mu$m/sec., a positional deviation is produced in the read-out image in correspondence to the displacement of the CCD elements in the two rows in an optical signal time t according to the scanning speed Vx $\mu$m/sec. Accordingly, the time at which the first row CCD elements provide output, is delayed for a predetermined number of lines while setting the same timing of fetching optical signal, i.e., storage timing, for the first-and second-row CCD elements. In this way, the positional deviation between the first and second row CCD elements is corrected. For example, where the line width of the reading density in the secondary scanning direction is one half of g, the output of the first-row CCD elements is delayed for two lines. That is, the output of the first-row CCD elements, which read out image data first, is delayed for a number of lines, corresponding in number to the positional deviation of the line shift gate. Therefore, the output of the second-row CCD elements, which read out image data subsequently, is simultaneously obtained. In this way, a read-out image free from distortion is obtained.

Where the correction is done line by line in the manner as described above, however, a deviation for at most 0.5 line (Vxta) results in the read-out image with respect to the displacement Vxt of CCD elements in the optical signal storage time t when the reading density, i.e., reading line density, is varied continuously, not stepwise, by varying the speed of scanning of the original. In other words, perfect correction can not be obtained when the displacement Vxt of CCD elements noted above is not an integral multiple fraction of the positional deviation of the CCD elements, that is, when the deviation of the CCD elements is not an integral multiple of the line width of the reading density.

SUMMARY OF THE INVENTION

Accordingly, it is an object of the present invention to provide an image-reading apparatus having a deviation correcting function, in which the read-out image can be corrected with a higher degree of accuracy than in the line-by-line case, to obtain deviation-free images at all times, even when the deviation of CCD elements is not an integral multiple of the line width of the reading density.

To attain the above object of the invention, there is provided an image-reading apparatus for reading data by means of a charge-coupled device, which comprises first and second line image sensor means for photoelectrically converting light from an object and having an image-reading density variable in a secondary scanning direction perpendicular to the main scanning direction noted above, the first and second line image sensor means being arranged in two rows, and the first line image sensor therefore has a positional deviation ahead of the second line image sensor in the main scanning direction, and drive means for generating pluralities of first and second drive signals corresponding to the positional deviation between the first and second line image sensor means and the reading density noted above and supplying these drive signals to the first and second line image sensor means.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 4 is a side view of the scanner as is shown in the apparatus of FIG. 1;

FIG. 5 is an example showing a perspective view of an arrangement of CCD elements;

FIGS. 8A to 8N are waveform diagrams showing storage timing in cases when the reading image of the apparatus in FIG. 1 is corrected line by line; and FIGS. 9A and 9B schematically illustrate the operation of correction.

DETAILED DESCRIPTION OF THE PREFERRED EMBODIMENT

Figure 1:
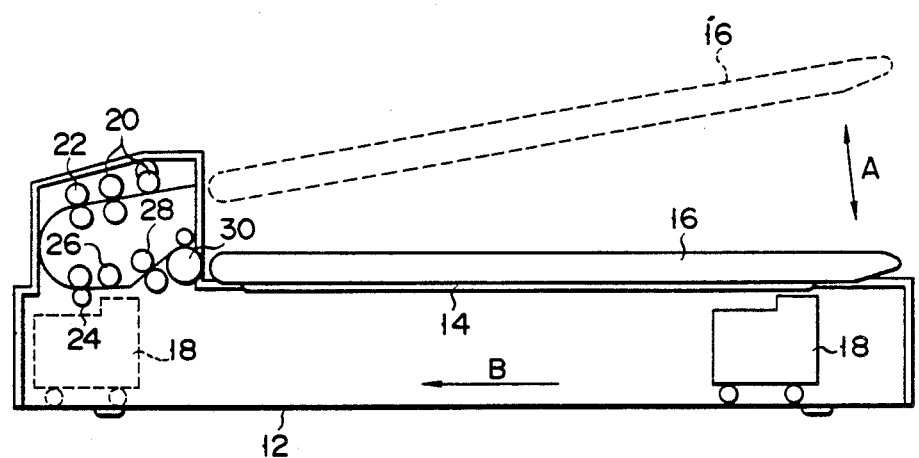
FIG. 1 is a schematic illustration of an elevated side section of an image-reading apparatus according to the invention.

Now, an embodiment of the present invention will be described with reference to the Figures. FIG. 1 shows an embodiment of the apparatus according to the invention applied to an original image-reading apparatus (image scanner). The illustrated apparatus comprises frame 12, to which original table 14, comprising a transparent glass, is secured. Original table 14 is provided with original cover 16 which is movable in the direction of arrow A. Scanner 18 is provided below original table 14 such that it is reciprocal thereunder. An original, which is set on original table 14, is optically read out as scanner 18 is moved along the underside of original table 14 in the direction of arrow B from its position designated by solid lines to its position shown by dashed lines. In this case, scanner 18 is moved at a speed corresponding to an original reading density, i.e., reading line density.

Further, with the movement of scanner 18 to its position, designated by dashed lines an original, which is fed manually through a stem of original cover 16, is read out optically. In this case, the manually fed original is inserted along original cover 16 held at an upwardly displaced position, fed by feed rollers 20 and transported by pair transport rollers 22. The transported original is timed by pair aligning rollers 24 and then fed onto reading roller 26 at a reading position to be read out by scanner 18. Subsequently, the original is discharged through pair transport rollers 28 and pair exit rollers 30 onto original table 16. The speed of transfer of the original in the reading at the reading position is variable according to the original reading density. Thus, the reading density in the secondary scanning direction perpendicular to the scanning direction can be readily varied by changing the speed of transport noted above.

Figure 2:
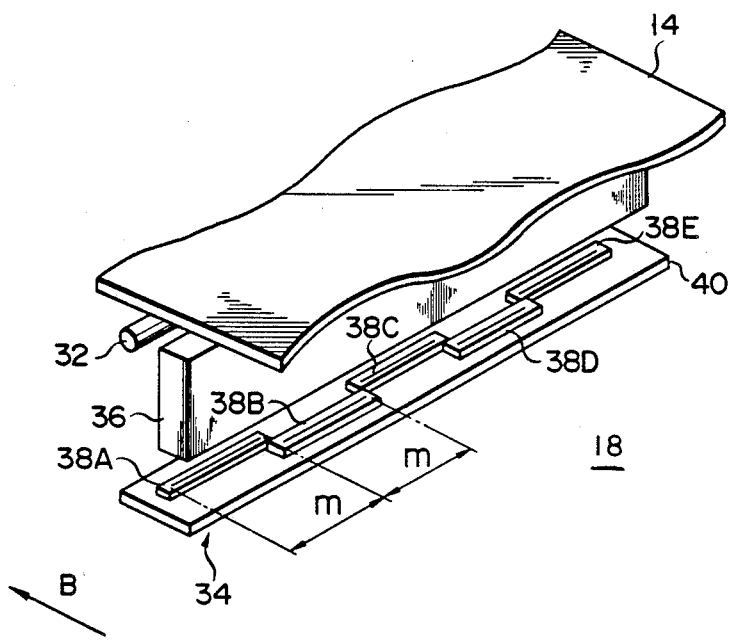
FIG. 2 is a fragmentary perspective view, showing a scanner of the apparatus as shown in FIG. 1.
Figure 3:
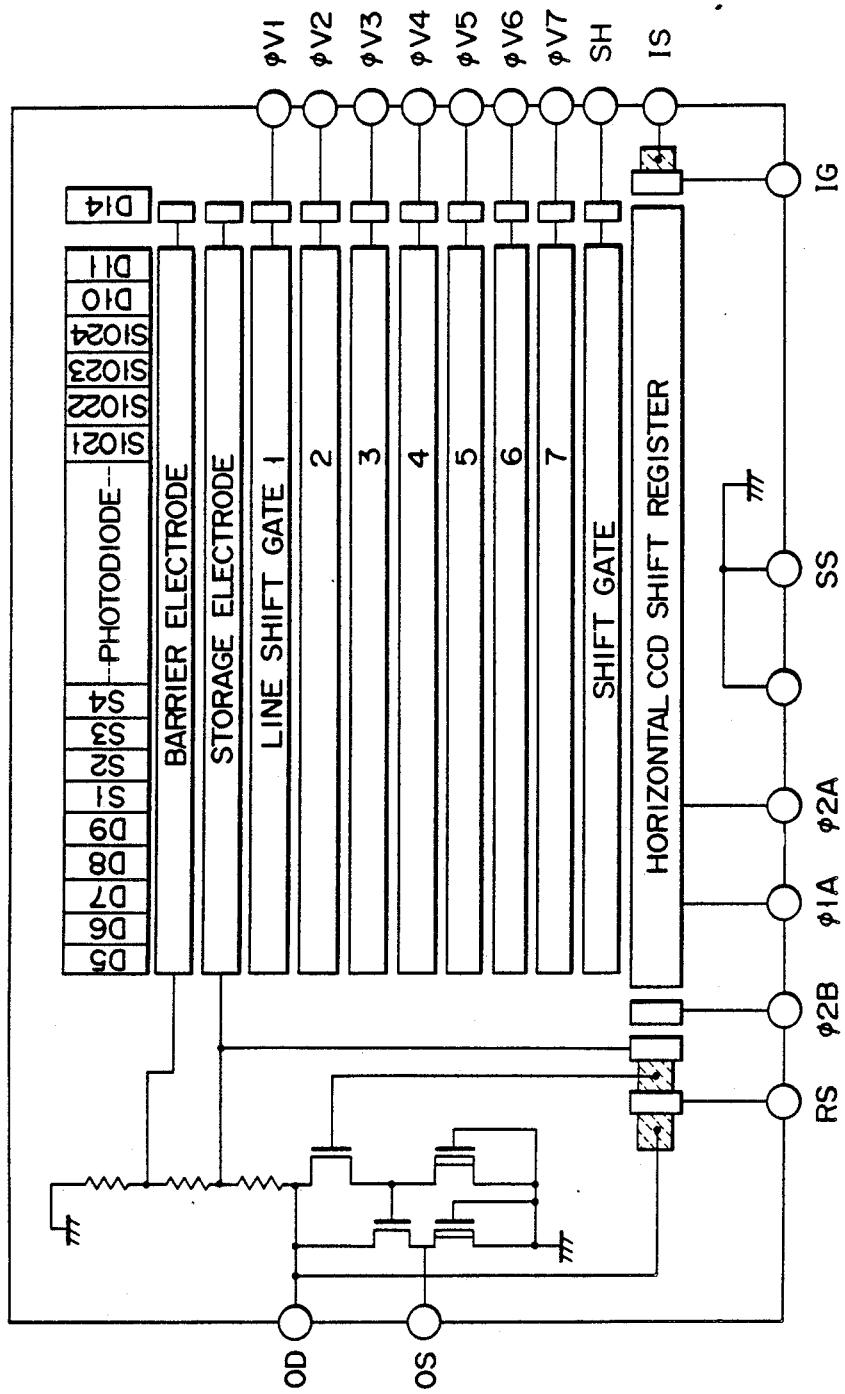
FIG. 3 is a schematic representation of a circuitry illustrating CCD elements as shown in FIG. 2.

Scanner 18, as shown in FIG. 2, comprises exposure lamp 32, e.g., a xenon lamp, for illuminating the original, photoelectric converter 34 for receiving light reflected from the original, and focusing-light lens 36 or the like for leading light reflected from the original to photoelectric converter 34. Exposure lamp 32, photoelectric converter 34 and focusing-light lens 36 are supported by a carriage (not shown). Photoelectric converter 34 photoelectrically converts light reflected by the original into an image signal which provides image information. Photoelectric converter 34 comprises a plurality of, e.g., five, charge-coupled devices, e.g., sensor chips in a staggered arrangement. The CCD line image sensor consists of CCD elements 38A through 38E formed on ceramic printed circuit board 40. CCD elements 38A to 38E, as shown in FIG. 3, have respective line memories (or line shift gates), permitting line-by-line correction.

The detection lines of CCD elements 38 are arranged in a staggered fashion on printed circuit board 40. As shown in FIG. 4, the detection lines constituting one group and the detection lines constituting the other group are parallel to each other, and the distance (g) therebetween is equal to the length of effective field range Δl of focusing-light lens 36. The distance g noted above corresponds to several scanning lines in the secondary scanning direction. Further, as shown in FIG. 5, CCD elements 38A through 38E each have an effective reading length m, that is, five CCD elements 38A to 38E provide a length (or width) of 5 m. With this arrangement, original O can be read out. If n CCD elements 38 are arranged, an original O having a width of nm can be read out. In this way, it is possible to freely select the reading width.

Figures 6, 7:
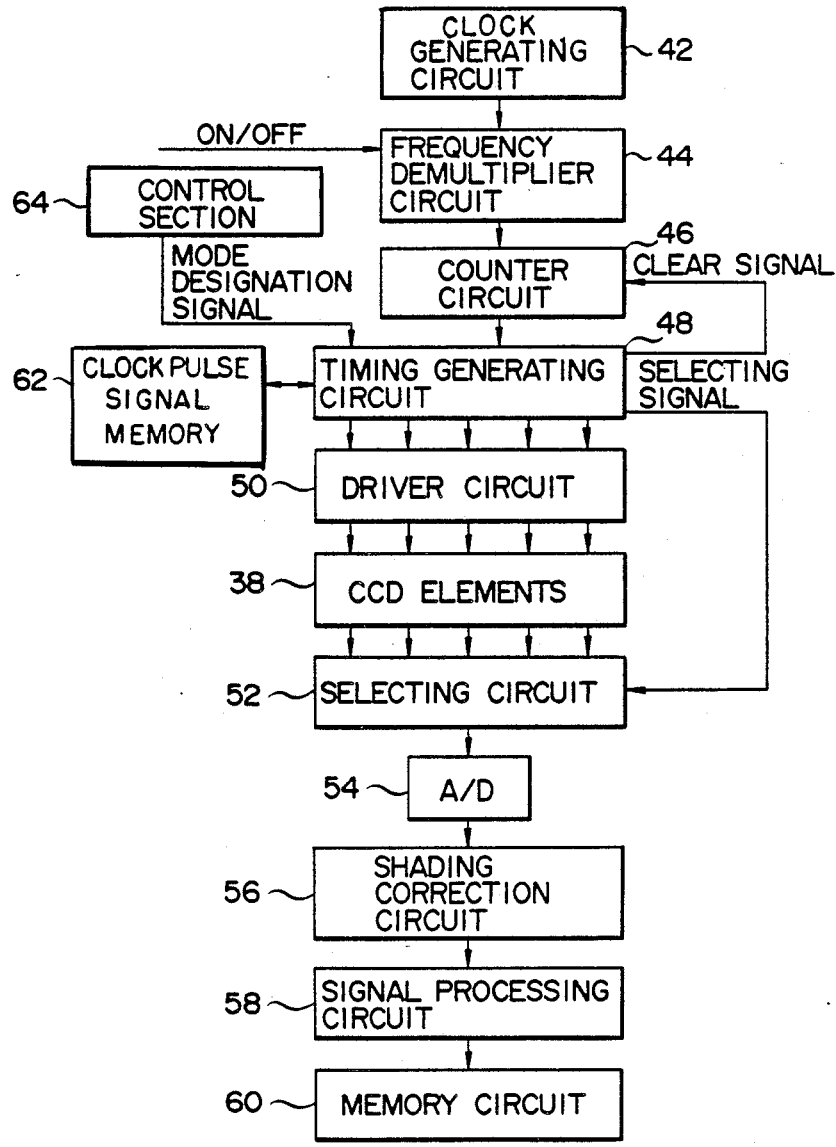
FIG. 6 is a schematic top view showing CCD elements.
FIG. 7 is a block circuit diagram displaying a control circuit.

CCD elements 38, as shown in FIG. 6, have yellow, green and cyan filters provided on the reading surface. Each of the filters provide three analog chrominance signals, i.e., yellow (Y), green (G) and cyan (C), for each pixel of original O.

FIG. 7 schematically portrays the control system of the image-reading apparatus. Clock generating circuit 42 serves as a timing source. A clock pulse signal, generated from clock generating circuit 42, is frequency demultiplied by frequency demultiplier circuit 44 which is supplied via counter circuit 46 to timing generating circuit 48. Driver circuit 50 (i.e., sensor driver) drives all CCD elements 38 simultaneously, in accordance with the output of timing generating circuit 48. The output signals of CCD elements 38 are supplied on a time division basis via selecting circuit 52 to A/D converter 54 for conversion into a digital signal. The digital signal thus obtained is subjected to shading correction in shading correction circuit 56 and then subjected to various electrical processing in signal processing circuit 58 before being output to memory circuit 60. The individual circuits of the control system are provided on printed circuit board 40.

Timing generating circuit 48 clears counter circuit 46 at the end of one reading cycle period of CCD elements 38. The circuit is thus driven for every predetermined cycle period. Timing generating circuit 48 provides selecting circuit 52 with a selecting signal corresponding to the count of clock pulses supplied as addresses of CCD elements 38. According to the selecting signal, selecting circuit 52 switches the outputs of CCD elements 38 which are supplied to A/D converter 54. Clock pulse signal memory 62 is connected to timing generating circuit 48, and stores clock pulse signals of different optical signal storage timings which are accessed by the output of timing generating circuit 48. For example, clock pulse signals of shifted storage timings of CCD elements 38 which read out image information (i.e., elements 38A, 38C, and 38E) first with respect to the storage timings of the CCD elements reading image information (i.e., elements 38B and 38D), and later according to the positional deviation of CCD elements 38 and the image reading density are stored in clock pulse signal memory 62. Therefore, as a function of the varying scanning speed of scanner 18, a clock pulse signal, corresponding to the positional deviation of CCD element 38 and image reading density, is selected from clock pulse signal memory 62, provided by timing generating circuit 48 according to a mode designation signal supplied by control section 64 when varying the image reading density in the secondary scanning direction.

Selecting circuit 52 corrects the voltage output of CCD elements 38A through 38E, according to a selecting signal from timing generating circuit 48, in order to supply the voltage outputs to A/D converter 54 at switched timings.

At this time, signal processing circuit 58 performs electrical processing, e.g., filtering, line density conversion, image area separation, area removal, dither processing, on signals having been shading corrected.

Now, a description will follow of deviation correction of a read-out image by variation of storage timing (pulse) of an optical signal according to the positional deviation of CCD elements 38 and the image reading density. In expressing the original reading density in dots per inch (DPI) and assuming the optical signal storage time of CCD elements 38 to be t seconds, the optical signal storage time t can be obtained from the original scanning speed at a standard reading density. Assuming the reference reading densiy to be 400 DPI and the positional deviation g between CCD elements 38A, 38C and 38E and CCD elements 38B and 38D to be 254 μm, the original scanning speed V at this time is given as:

$$V = \frac{254}{4} \times \frac{1}{t} \ (\mu m/s) \quad (1)$$

Thus, the scanning speed Vx of scanner 18 when the reading density is $\rho \times 10^2$ DPI is:

$$Vx = \frac{254}{\rho} \times \frac{1}{t} \ (\mu m/s) \quad (2)$$

When correcting the read-out image deviation (i.e., disftortion) at given reading density $\rho \times 10^2$ DPI, line-by-line correction can not be obtained unless the displacement Vxt of scanner 18 in the optical signal storage time t is an integral number fraction of the positional deviation g of CCD elements 38, as shown in FIG. 9A. For this reason, it is possible to correct image deviation, which can not be corrected by line-by-line correction, by shifting the optical signal storage timing between CCD elements 38.

FIGS. 8A through 8I show timings of CCD elements 38A, 38C, and 38E, FIGS. 8A through 8G show line shift gate outputs φV1 to φV7 as shown in FIG. 3, and FIGS. 8H and 8I show outputs of shift gate SH and a horizontal CCD register. FIGS. 8J through 8N show timings of CCD elements 38B and 38D. FIG. 8J shows line shift gate output φV1 as shown in FIG. 3. FIG. 8K shows line shift gate outputs φV2, φV4, and φV6. FIG. 8L shows line shift gate outputs φV3, φV5, and φV7. FIGS. 8M and 8N show outputs of shift gate SH and horizontal CCD register. The optical signal storage timing is changed between CCD elements 38A, 38C, and 38E as shown in FIGS. 8A through 8I and CCD elements 38B and 38D as shown in FIGS. 8J and 8N. In other words, the distortion of the image is corrected by shifting the optical signal storage time t of CCD elements 38A, 38C and 38E by correction time ta according to the displacement Vxt of scanner 18 in correspondence to the deviation g of CCD elements 38 and original reading density. In this case, the correction time ta is given as;

$$(n-1)Vxt < g \leq nVxt, \quad (3)$$

wherein n is an integer.

Obtaining the integer n meeting equation (3), $$Vxta = nVxt - g$$

$$ta = nt - (g/Vx) \quad (4)$$

Substituting equation (2) into equation (4)

$$ta = nt - \frac{1}{254} \times gxt \quad (5)$$

$$= \left(n - \frac{gx}{254}\right)t$$

Thus, when the positional deviation g between CCD elements 38A, 38C and 38E, and CCD elements 38B and 38D is 254 μm, from equation (5)

$$ta = (n-x)t \quad (6)$$

In this way, correction time ta is obtained.

More specifically, by varying the correction time ta in predetermined optical signal storage time t (0 < ta < t), correction of the image distortion Vxta can be obtained distance-wise according to the displacement (0 < Vxta < Vxt) as shown in FIG. 9B. It is thus possiblle to obtain correction of the read-out image with an accuracy higher than that of the line-by-line correction case.

Now, the operation of the control system having the above construction will be described. When an original is set on original table 14 and scanner 18 is moved in the direction of arrow B in FIG. 1, the scanning of the original begins. That is, the original is illuminated by light from exposure lamp 32, and light reflected from the original is led through focusing-light lens 36 to CCD elements 38. At this time, driver circuit 50 simultaneously drives CCD elements 38A to 38E for each bit according to the clock pulse signal output from timing generating circuit 48. At the same time, the optical signal storage timing is shifted for a predetermined period of time between CCD elements 38A, 38C and 38E and CCD elements 38B and 38D according to a pulse signal corresponding to the positional deviation between CCD elements 38 and the speed of scanning of the original by scanner 18.

The correction time is then calculated. When image data is read out by scanner 18, in which the positional deviation g between CCD elements 38 is 254 μm and the reference reading density is 400 DPI, with the scanning speed V set to $11.5\pi \times 10^3$ μm/sec, and the reading density set to 340 DPI ($\rho = 3.4$), the correction time ta is as follows. From equation (1), the optical signal storage time t is $$t = \frac{254}{4} \times \frac{1}{V}$$

$$= \frac{254}{4} \times \frac{10^{-3}}{11.5\pi} \approx 1.7576 \ (ms)$$

The scanning speed Vx of scanner 18, from equation (2), is $$Vx = \frac{254}{3.4} \times \frac{1}{t}$$

$$= \frac{4}{3.4} \times 11.5\pi \times 10^3 \ (\mu m/s)$$

By substituting the optical signal storage time t and scanning speed Vx into equation (3), $$(n-1) \times \frac{254}{3.4} < 254 \leq n \times \frac{254}{3.4}$$

$$\frac{n-1}{3.4} < 1 \leq \frac{n}{3.4}$$

-continued $n = 4$

Thus, the correction time ta is, from equation (6), $$ta = (4 - 3.4)t$$
$$= 0.6 \times \frac{254}{4} \times \frac{10^{-3}}{11.5\pi}$$
$$\approx 1.0546 \text{ (ms)}$$

Thus, the optical signal storage timing of CCD elements 38A, 38C, and 38E are to be delayed by 1.0546 msec. with respect to the optical signal storage timing of CCD elements 38B and 38D. This is done by accessing clock pulse memory 62 to obtain signals for shifting the optical signal storage time t of CCD elements 38A, 38C, and 38E according to the correction time ta, as shown in FIGS. 8A through 8N. Consequently, even if the displacement Vxt of scanner 18 is not an integral number fraction of the deviation g between CCD elements 38 as shown in FIG. 9A, the distortion Vxta of the read-out image between CCD elements 38 is corrected according to the displacement Vxta as shown in FIG. 9B.

The analog signals from individual CCD elements 38 are switched on a time division basis by selecting circuit 52, which is controlled according to a selecting signal provided by timing generating circuit 48. Thereafter, the signals are subjected to a level correction by an amplifier (not shown) and are then supplied to A/D converter 54. The analog signals from CCD elements 38 are sequentially converted into digital signals to be provided to shading correction signal 56. After the signal is obtained from shading correction circuit 56 it is supplied to a signal processing circuit 58 to be subjected to various electric processing before being stored as image signals in memory circuit 60. As the image signals stored in memory circuit 60 are read out sequentially in the main scanning direction, they are provided to an image forming apparatus (not shown) as one line of image data.

As has been shown, the deviation (i.e., distortion) of the read-out image is corrected by varying the optical signal storage timing to independent timings according to the positional deviation of CCD elements and image reading density. In this way, the read-out image area can be controlled with a higher accuracy than in the case of the line-by-line correction, and it is possible to obtain distortion-free images at all times independent of the scanner's speed of movement or the original transport speed. It is thus possible to vary the reading density in the secondary scanning direction and realize continuous or stepless scale enlargements or reductions.

In the above embodiment, the optical signal storage timing is varied according to the positional deviation of CCD elements and the original scanning speed as image reading density. However, this is by no means limitative, and when a manually fed original is read out, the optical signal storage timing may be varied according to the positional deviation of CCD elements and the original transport speed.

Further, while the above embodiment has been concerned with the original image reader apparatus (i.e., image scanner), the invention is also applicable to an original scanning section of a facsimile set, a copying machine, etc.

What is claimed is:

1. An image-reading apparatus having a deviation correcting function comprising:
   first and second line image sensor means for scanning an object in a main scanning direction and photoelectrically converting light from the object, and having an image reading density variable in a secondary scanning direction perpendicular to said main scanning direction, said first and second line image sensor means arranged in two rows separated in said secondary scanning direction such that said first line image sensor means reads an image of the object earlier than said second line image sensor means;
   memory means for storing a plurality of drive signals corresponding to the separation of the first and second line image sensor means in the secondary scanning direction and a plurality of image reading densities;
   designating means for designating one of the drive signals stored in the memory means which corresponds to a current image reading density of the first and second line image sensor means; and
   drive means for supplying said designated drive signal to said first and second line image sensor means in response to the designation by said designating means.

2. An image-reading apparatus according to claim 1, wherein said first and second line image sensor means are of a close-contact type.

3. An image-reading apparatus according to claim 2, wherein said first and second line image sensor means include a plurality of charge-coupled devices.

4. An image-reading apparatus according to claim 3, wherein said charge-coupled devices are arranged in two rows, in a staggered fashion.

5. An image-reading apparatus according to claim 4, wherein the arrangements of said charge-coupled devices are staggered such that the charge-coupled devices in a first row are positioned in front of the charge-coupled devices in a second row in said main scanning direction the first line image sensor means comprising the charge-coupled devices in the first row and the second line image sensor means comprising the charge-coupled devices in the second row.

6. An image-reading apparatus according to claim 5, wherein said drive means reads out the designated drive signal from the memory means and delays a storage timing of the charge-coupled devices of the first line image sensor means for a predetermined period of time relative to a storage timing of the charge-coupled devices of the second line image sensor means in response to the read-out designated drive signal.

7. An image-reading apparatus according to claim 6, wherein said drive means comprises a timing generating circuit for generating a plurality of drive signals in response to the read-out designated drive signal and a driver circuit for driving said charge-coupled devices according to said plurality of drive signals generated by said timing generating circuit.

8. An image-reading apparatus according to claim 3, wherein the maximum width of said object is determined by the number of said plurality of said charge-coupled devices.

* * * * *